United States Patent [19]

Howells et al.

[11] 4,357,672
[45] Nov. 2, 1982

[54] DISTANCE RANGING APPARATUS AND METHOD

[75] Inventors: Joseph A. Howells, Brookfield Center, Conn.; Seymour J. Sindeband, Pound Ridge, N.Y.

[73] Assignee: Science Accessories Corporation, Southport, Conn.

[21] Appl. No.: 173,723

[22] Filed: Jul. 30, 1980

[51] Int. Cl.³ .............................................. G06F 15/20
[52] U.S. Cl. ..................................... 364/561; 367/127
[58] Field of Search ............................ 364/560–563, 364/516, 200; 367/127, 99, 108, 907

[56] References Cited

U.S. PATENT DOCUMENTS

| | | | |
|---|---|---|---|
| 3,757,285 | 9/1973 | Ferré ................................... | 367/108 |
| 4,012,588 | 3/1977 | Davis et al. ....................... | 367/907 X |
| 4,037,189 | 7/1977 | Bell et al. ........................... | 367/127 |
| 4,038,530 | 7/1977 | Miyahara et al. ................. | 364/516 |
| 4,049,954 | 9/1977 | Vieira ................................. | 364/560 |
| 4,113,382 | 9/1978 | Freudenschuss ................ | 364/561 X |
| 4,118,782 | 10/1978 | Allen et al. ...................... | 364/516 X |
| 4,136,394 | 1/1979 | Jones et al. ....................... | 367/108 X |
| 4,238,844 | 12/1980 | Ueda et al. ....................... | 367/127 X |
| 4,247,768 | 1/1981 | Elmer et al. ..................... | 364/562 X |
| 4,264,978 | 4/1981 | Whidden ........................... | 367/127 X |

*Primary Examiner*—Edward J. Wise
*Attorney, Agent, or Firm*—Martin Novack

[57] ABSTRACT

The disclosure is directed to a microprocessor-based apparatus and method for determining the distance between an object and a reference position. An embodiment of a graphical digitizer is set forth in which a microprocessor system is adapted to generate and store a count that depends upon the number of instruction cycles that the microprocessor system performs during a time interval that is a function of the travel time of acoustic wave energy traveling between the object and the reference position. In a disclosed embodiment, acoustic receivers are mounted with their axes parallel, and each receiver has a generally circular receptivity pattern.

33 Claims, 4 Drawing Figures

DISTANCE RANGING APPARATUS AND METHOD

BACKGROUND OF THE INVENTION

This invention relates to improvements in distance ranging apparatus and, more particularly, to a distance ranging technique and apparatus, such as a graphical digitizer, which employs a microprocessor.

Systems which perform a distance ranging function are in widespread use for various purposes. The improvement of the present invention is particularly applicable to ranging systems which employ wave energy, preferably acoustic wave energy or other wave energy which is of the nature of a mechanical disturbance, in the determination of the distance between an object and a reference location by determining the transit time of the wave energy traveling between the object and the reference. One type of equipment that employs this principle is the graphical data digitizer that is conventionally used to input graphical coordinate information, or the like, to a companion system. In a graphical data digitizer wave energy is typically passed between a movable element (such as a stylus or cursor) and one or more transducers located at fixed reference locations. The transit time of the wave energy traveling between the movable element and the reference locations is used in determining the position of the movable element, typically in terms of digital coordinates. There are many types of commerically available graphical data digitizers, and these operate in a variety of ways. For example, the type of graphical data digitizer manufactured and sold by applicants' assignee, Science Accessories Corp., measures the transit time of acoustic wave energy propagating through air. Other graphical data digitizers measure the transit time of wave energy through a solid data tablet, or through wires, etc. Regardless of the transition medium employed, a necessary part of these systems is timing circuitry for timing the travel of wave energy between the movable element and one or more reference locations or positions. Typically, clock pulses are generated at a predetermined rate and circuitry is used to initiate a count of clock pulses when the wave energy is emitted from the movable element (or the reference, depending on the mode of operation) and subsequently to terminate the count when the wave energy arrives at the reference location (or the movable element). The circuitry for generating this timing (typically, in at least two coordinates) can tend to be expensive and to increase the manufacturing cost of a graphical data digitizer equipment. The cost of this circuitry can be particularly significant when attempting to manufacture a relatively low cost system, for example, a graphical data digitizer system that would be affordable by the public at large for use in conjunction with personal computers.

Another type of equipment which employs a sonic ranging principle is an automatically focusing camera.

It is an object of the present invention to provide an improved sonic ranging apparatus and method which employs a microprocessor and uses the operational cycles of the microprocessor to effect accurate and economical range determination.

SUMMARY OF THE INVENTION

The present invention is directed to an apparatus and method for determining the distance between an object and a reference position. A microprocessor system is provided, and includes a central processor unit, a memory, and a timing circuit for producing timing pulses which determine the rate at which said microprocessor system performs individual instructions. In the apparatus form of the invention, means controlled by the microprocessor system are provided for generating propagating wave energy. Further means are provided for detecting the wave energy after it has passed between the object and the reference position. (It can be noted that the energy may pass in either direction between the object and the reference position.) The microprocessor system is adapted to generate and store a count that depends upon the number of instruction cycles that the microprocessor system performs during a time interval that is a function of the travel time of said wave energy traveling between the object and said reference position. Assuming the propagation speed is known (e.g. through air), the count will be indicative of the distance between the object and the reference position.

In accordance with a preferred form of the apparatus of the invention, there is disclosed a graphical data digitizing device for determining the position of a movable element with respect to first and second reference locations. In this embodiment, the means controlled by the microprocessor system is used to generate pulses of acoustic wave energy at the movable element. First and second spaced acoustic receivers are coupled to the microprocessor system. The microprocessor system is adapted to initiate a first count of instruction cycles of the microprocessor system upon generation of a pulse of acoustic wave energy, and to terminate said first count when the acoustic wave energy is received at the first acoustic receiver. Further, the microprocessor system is adapted to initiate a second count of its instruction cycles when the pulse of acoustic wave energy is generated and to terminate said second count when the acoustic wave energy is received at the second receiver. The terminated first and second counts are stored and are indicative of the distance between the movable element and the first and second receivers, respectively. In the disclosed embodiment, the acoustic receivers are mounted with their axes parallel, and each receiver has a generally circular receptivity pattern.

The present invention has advantage for use in conjunction with apparatus which performs sonic ranging through air. In particular, propagation through air is slow enough that a count of microprocessor system instruction cycles is at a high enough rate to provide a substantial number of counts per unit distance traveled by the sound wave energy. Since, under present technology, the operating frequency of existing economical microprocessor systems is limited, the relatively slow propagation speed of sound through air is an advantage in obtaining adequate resolution with economically available operating frequencies.

Further features and advantages of the invention will become more readily apparent from the following detailed description when taken in conjunction with the accompanying drawings.

DESCRIPTION OF THE PREFERRED EMBODIMENT

Figure 1:
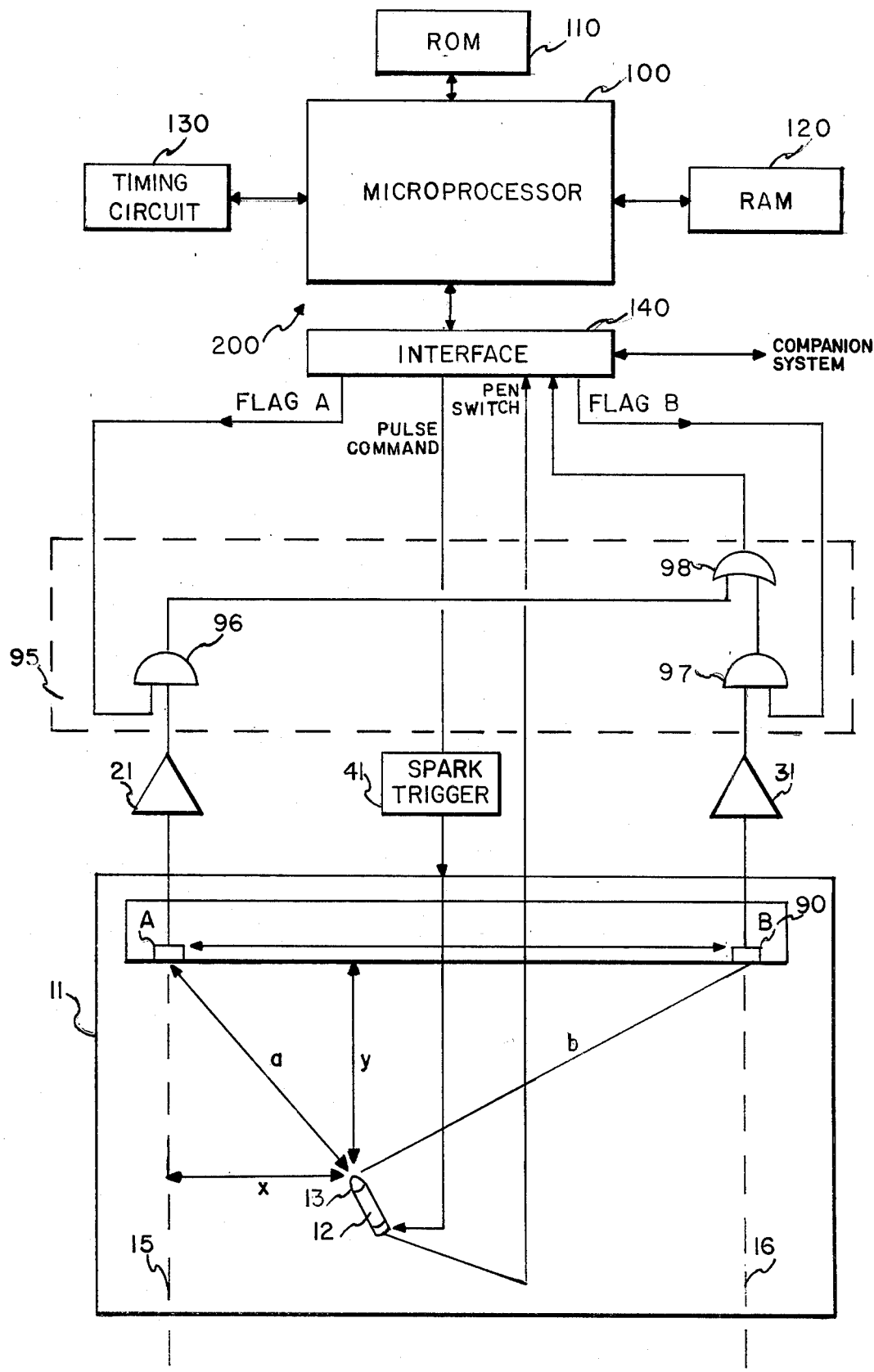
FIG. 1 is a block diagram of a graphical data digitizing device in accordance with the invention and which can be used to practice the method of the invention.

In FIG. 1 a data space is generally defined by the surface area just above a generally flat surface 11, although it will become clear that the data space in accordance with the invention is not necessarily restricted and that the surface is supportive only and performs no active function in the operation of the invention. As a practical matter, the surface 11 may be a glass or plastic sheet for supporting documents for writing purposes and sufficiently transparent to enable tracings to be made, or it may be the surface of a display device upon which specific points, lines or areas are to be precisely located. A movable element or "stylus" 12, preferably in cartridge form, is movable over the surface 11 and has a tip 13 which may, for example, be a conventional ball point pen cartridge. The tip of the stylus also includes an electrode pair which has a gap for producing an electrical discharge in the form of a spark. The spark is constituted by a sudden discontinuous discharge of electricity through air and produces a fast rise time sound pulse or wave radiating from the point of discharge. The spark-generating stylus is well known in the art and is described in further detail, for example, in the U.S. Pat. No. 3,838,212. Other techniques can alternatively be used for generating pulses of acoustic energy, for example by employing a piezoelectric transducer.

Figure 2:
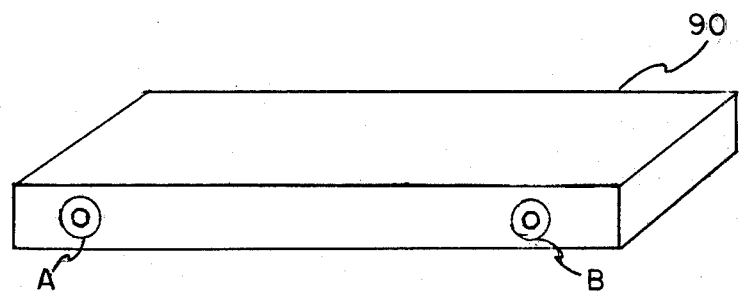
FIG. 2 is a front elevational perspective view of the housing of the embodiment of FIG. 1, showing the microphones of the embodiment of FIG. 1.

The stylus sparks, which may be individual or at regular intervals, are triggered by a spark trigger circuit 41 which is also disclosed in the U.S. Pat. No. 3,838,212. The shock wave created by the spark at the tip of stylus 12 propagates through the atmosphere until contacting transducers A and B which, in the present embodiment, are electret button microphones each having a substantially circular receptivity pattern. The microphones are mounted along a straight line, a distance c apart, in an elongated, hollow, generally rectangular housing 90, typically formed of metal or plastic. The bar-shaped housing 90, which also preferably houses all of the electronics set forth in FIG. 1, is also illustrated in FIG. 2, which shows a front view of the microphones A and B. The microphones, which may be, for example "Realistic" brand lapel microphones sold by Tandy Corp., have parallel axes in the present embodiment. The microphones preferably have a circular receptivity pattern and a virtual center which is helpful in obtaining more accurate digitalization.

The outputs of microphones A and B are coupled via amplifiers 21 and 31, respectively, to logic circuitry 95 which is, in turn, coupled to interface 140 of a microprocessor system 200. The microprocessor system 200 includes a microprocessor central processing unit 100, which may be any suitable unit for example a model Z80 manufactured by Zilog Corp. of Cupertino, Calif. As is conventional in the microprocessor art, the microprocessor central processing unit 100 operates in conjunction with other components of the microprocessor system 200, viz., a read-only memory (ROM) 110 in which the program is stored, a random access memory (RAM) 120, and a timing circuit 130 which includes the basic system clock. The timing circuit 130 may be any suitable microprocessor timing generator as is disclosed, for example, in the "TRS-80 Microcomputer Technical Reference Handbook" of Tandy Corp. In one form of the present invention, a basic clocking frequency of about 2 MHz was employed. The interface 140 is preferably a standard parallel input/output interface, for example, a "PIO" interface manufactured by Zilog Corp. for use in conjunction with the Zilog Model Z-80 microprocessor. A "pen switch" in the tip 13 of stylus 12 is coupled to the microprocessor system via interface 140.

Included in the logic circuitry 95 are AND gates 96 and 97 and an OR gate 98. The AND gate 96 receives as one input thereof the output of microphone A via amplifier 21 and as its other input a signal designated "flag A" which is received from microprocessor 100 via interface 140. The AND gate 97 receives as one input the output of microphone B via amplifier 31, and receives as its other input a signal designated "flag B" which is received from microprocessor 100 via interface 140. The outputs of AND gates 96 and 97 are coupled to the inputs of OR gate 98 whose output is coupled to an "interrupt" input of microprocessor 100 via interface 140.

A companion system (not shown) which is typically a computer but may be any companion equipment which utilizes the digital information produced by the disclosed apparatus, is coupled to microprocessor via interface 140 (or via another interface, if desired). Also, suitable power supplies (not shown) are provided to the apparatus, as is conventional.

Operation of the FIG. 1 apparatus is controlled by the microprocessor system 200, as will be described in detail hereinbelow in conjunction with the microprocessor program flow diagram. Briefly, however, operation of the apparatus is as follows: The distances between the stylus tip and the microphones A and B can be determined from the time duration of transit of acoustic energy between the stylus tip and each microphone. When a spark is generated at the stylus tip, the microprocessor immediately begins keeping track of the time it takes for the sound wave front to reach the microphones. This is done by counting instruction cycles of the microprocessor system, and no additonal clock or scaler is necessary, as in conventional graphical data digitizers. When the sound energy reaches a selected one of the microphones, the count is terminated. The procedure is then repeated using the other microphone.

The spark shock wave produces a fast rise time electrical impulse upon impinging on the microphone surface, and the band pass amplifiers 21 and 31 allow only the fast rise time portion of the electrical pulse to pass while blocking out noise signals outside the band. To insure rapid operation, the amplifiers include threshold discriminators which provide an output pulse with steep leading edges in response to the input thereto exceeding a predetermined level. The range determinations are, of course, dependent upon the speed of sound in air which is essentially a known quantity. Since the velocity of sound in air varies with temperature, appropriate velocity compensation techniques can be employed, as known in the art, to generate suitable correction signals.

In FIG. 1 assume that microphone A is the origin and that the rectangular coordinates of the stylus tip are represented by x and y. If the distance between microphone centers is designated c and the distance between the stylus tip and the microphones A and B are respectively designated by a and b, the expressions for x and y are:

$$x^2 + y^2 = a^2 \qquad (1)$$

$$(c-x)^2 + y^2 = b^2 \qquad (2)$$

Solving for x and y yields:

$$x = \frac{a^2 - b^2 + c^2}{2c} \qquad (3)$$

$$y = \sqrt{a^2 - x^2} \qquad (4)$$

(See U.S. Pat. No. 4,012,588).

The dashed lines 15 and 16 indicate the bounds of the area within which the stylus position is to be determined in this embodiment. Determinations outside lines 15 and 16 (e.g. with negative values of x resulting from positions to the left of line 15) can be obtained, but excessively obtuse angles tend to introduce error due to number sizing.

Figure 3:
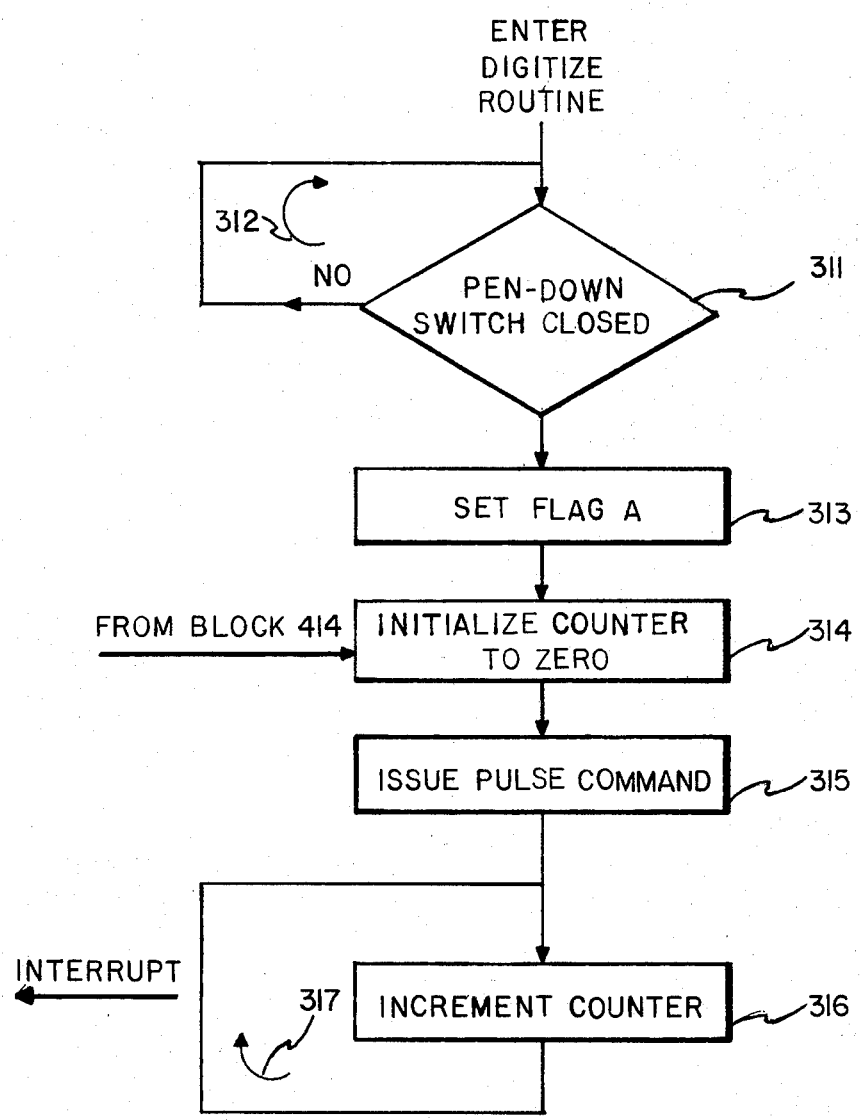
FIG. 3 is a flow diagram of the routine used to program the microprocessor system of the FIG. 1 embodiment.
Figure 4:
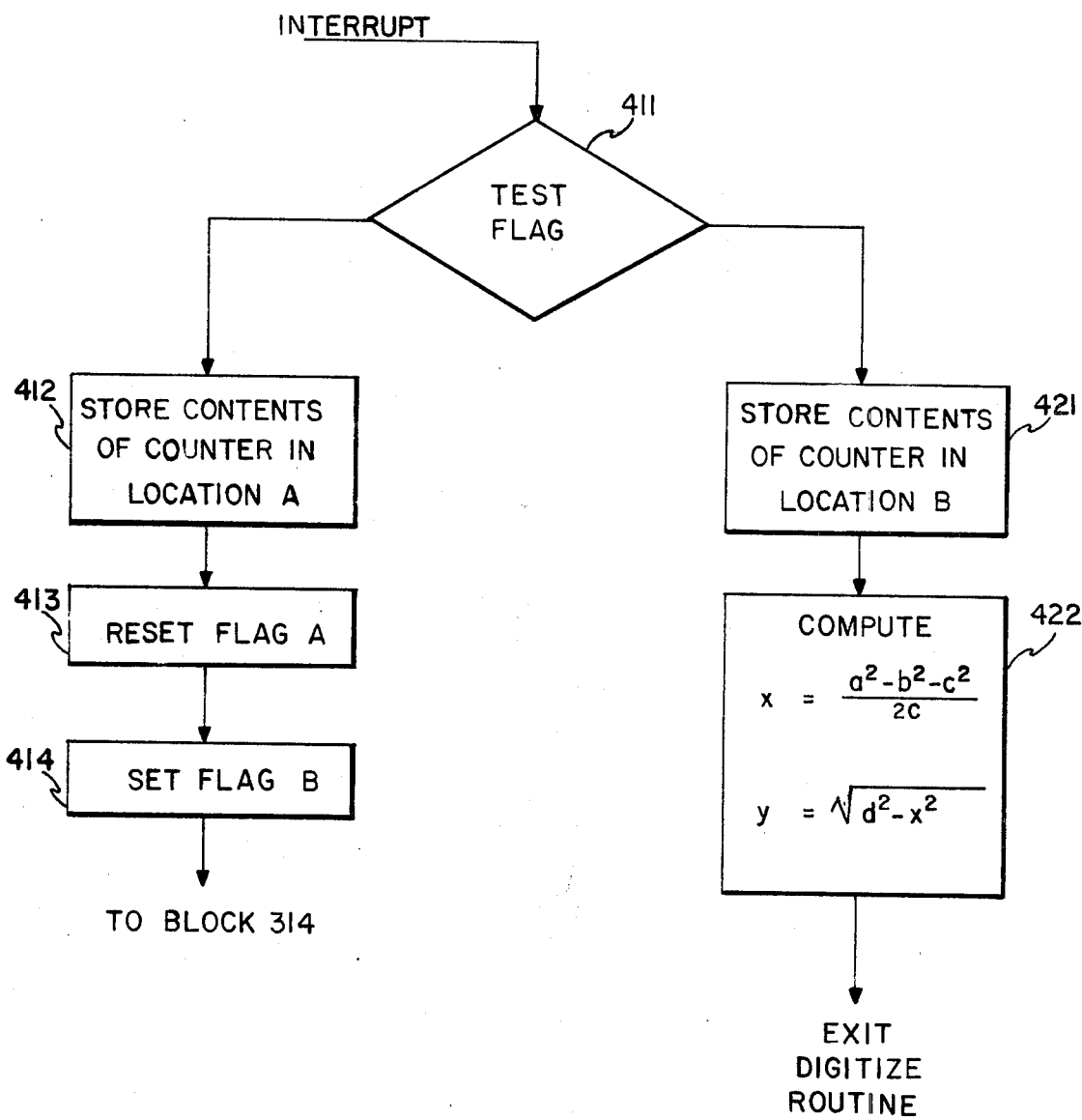
FIG. 4 is a flow diagram of the "interrupt" portion of the routine of FIG. 3.

Referring to FIGS. 3 and 4, there is shown a flow diagram in accordance with which the microprocessor system is programmed to carry out the functions described herein.

The flow diagram of FIG. 3 is entered when a command is made, via the computer or companion system (referenced in FIG. 1) to which the digital graphical information is to be fed, requesting the next piece of digitized graphical data. Alternatively, an operator-controlled switch (not shown) could be used to initiate the "digitize" routine of FIG. 3. At the beginning of the routine of FIG. 3, inquiry is made (decision diamond 311) as to whether or not the "pen down" switch of stylus 12 is closed. Typically, a contact switch at the end of the pen is conveniently used to indicate a point or series of points to be digitized by application of writing pressure. If the "pen-down" switch is open, the diamond 311 is reentered and loop 312 is continued while waiting for the pen-down switch to be closed. When the pen-down switch is sensed as being closed, block 313 is entered, this block representing the setting of a flag designated "flag A". A counter is then initialized at zero, as represented by the block 314. The block 315 is then entered and a pulse command is issued to the spark trigger 41 (FIG. 1). The counter, which has been initialized at zero, is then incremented (block 316), and continues to be incremented, as indicated by the loop 317. It will be understood that the counter can be incremented by using a series of "increment counter" instructions in the microprocessor program, in which case the count will be equal to the number of instruction cycles of the microprocessor system that occurred after issuance of the pulse command. Alternatively, the loop 317 could be implemented by following an "increment counter" instruction with a "jump back" instruction (i.e., jumping back to the "increment counter" instruction). The digitizer resolution is in terms of the count rate, so it is advantageous to have the highest possible count rate (for example, by implementing the loop 317 using a series of "increment counter" instructions). However, if the microprocessor is of the type which records the instruction from which an interrupt is implemented, it will be understood that one can alternatively obtain a maximized count of instruction cycles even when using a "jump back" instruction (which saves program space, as compared to a long series of "increment counter" instructions). In particular, the actual number of instruction cycles can be determined from a knowledge of whether an interrupt was effected from the "increment counter" instruction or the "jump back" instruction. In such case the number of instruction cycles will be either twice the stored count (in cases where the interrupt was effected after an "increment counter" instruction) or twice the stored count plus one (where an interrupt was effected after the "jump back" instruction).

The loop 317 continues until an "interrupt" occurs (output of OR gate 98 in FIG. 1) by virtue of sound wave energy being received at an acoustic receiver (A and/or B), and depending upon which flag is set. (When flag A is set, AND gate 96 is enabled and an output from receiver A will cause an interrupt via AND gate 96 and OR gate 98. When flag B is set, AND gate 97 is enabled and an output from receiver B will cause an interrupt via AND gate 97 and OR gate 98.) The "interrupt" routine is then entered, the flow diagram for this routine being illustrated in FIG. 4. When an interrupt occurs, a test is made to see whether flag A or flag B is set, as represented by the demand 411. If flag A is set, block 412 is entered and the contents of the counter are stored in location A. Flag A is then reset (block 413) and flag B is set (block 414). Return is then made to block 314 of the "digitize" routine.

If the determination of diamond 411 had indicated that flag B was set, the contents of the counter would be stored in location B (block 421). Block 422 can then be entered, and the (x,y) coordinates of the movable element (stylus or cursor) position are computed in accordance with relationships (3) and (4), set forth above. The routine is then exited and, typically, return is made to a predetermined point in the program of the computer or companion equipment to which the digitizer is coupled. It will be understood that, if desired, the computations indicated as being performed by block 422 could alternatively be performed by the companion computer or companion equipment.

As noted above, the present invention has particular advantage for use in conjunction with apparatus which performs sonic ranging through air. Propagation through air is slow enough that a count of microprocessor system instruction cycles is at a high enough rate to provide a substantial number of counts per unit distance traveled by the sound wave energy. Since, under present technology, the operating frequency of existing economical microprocessor systems is limited, the relatively slow propagation speed of sound through air is an advantage in obtaining adequate resolution with economically available operating frequencies.

The invention has been described with reference to a particular preferred embodiment, but variations within the spirit and scope of the invention will occur to those skilled in the art. For example, while an embodiment has been illustrated using two receivers, it will be understood that any desired number of one or more receivers can be used in obtaining ranging information or digitized coordinate information in from one to three dimensions. Also, it can be noted that interpolation techniques could be used to improve the resolution of the ranging system. Finally, while the described embodiment uses successive acoustic pulses to range to the two microphones, it will be recognized that one could alternatively arrange to count the propagation time to each microphone from a single acoustic pulse.

We claim:

1. Apparatus for determining the distance between an object and a reference position, comprising:
a microprocessor system including a central processor unit, a memory, and a timing circuit for producing timing pulses which determine the rate at which said microprocessor system performs individual instruction operations;
means controlled by said microprocessor system for generating propagating wave energy;
means for detecting the wave energy after it has passed between said object and said reference position;
said microprocessor system being adapted to generate and store a count that depends upon the number of instruction cycles it performs during a time interval that is a function of the travel time of said wave energy traveling between said object and said reference position;
said count being indicative of the distance between said object and said reference position.

2. Apparatus as defined by claim 1 wherein said microprocessor system is adapted to initialize a count of operational cycles upon the generation of said propagating wave energy and to terminate said count when said wave energy has traversed between said object and said reference position.

3. Apparatus as defined by claim 1 wherein said wave energy is acoustic wave energy.

4. Apparatus as defined by claim 2 wherein said wave energy is acoustic wave energy.

5. A graphical data digitizing device for determining the position of a movable element with respect to first and second reference locations, comprising:
a microprocessor system including a central processor unit, a memory, and a timing circuit for producing timing pulses which determine the rate at which said microprocessor performs individual instruction operations;
means controlled by said microprocessor system for generating propagating wave energy;
said microprocessor system being adapted to generate and store a first count that depends upon the number of instruction cycles it performs during a time interval that is a function of the travel time of said wave energy traveling between said movable element and said first location, and a second count that depends upon the number of instruction cycles it performs during a time interval that is a function of the travel time of said wave energy traveling between said movable element and said second location;
said first and second counts being indicative of the distance between said movable element and said first and second locations, respectively.

6. The device as defined by claim 5 wherein said wave energy is acoustic wave energy.

7. The device as defined by claim 6 wherein said propagating acoustic wave energy is generated at said movable element and wherein first and second acoustic receivers are located at said first and second locations, respectively.

8. The device as defined by claim 7 wherein said microprocessor system is adapted to initialize said first count of instruction cycles upon the generation of said acoustic wave energy and to terminate said first count when said acoustic wave energy is received at said first receiver.

9. The device as defined by claim 8 wherein said microprocessor system is adapted to initialize said second count of instruction cycles upon the generation of said acoustic wave energy and to terminate said second count when said acoustic wave energy is received at said second receiver.

10. The device as defined by claim 9 further comprising means responsive to said first and second counts for computing the rectangular coordinates of said movable element.

11. The device as defined by claim 9 wherein said microprocessor system is adapted to compute the rectangular coordinates of said movable element from said first and second counts.

12. The device as defined by claim 7 further comprising means responsive to said first and second counts for computing the rectangular coordinates of said movable element.

13. The device as defined by claim 7 wherein said microprocessor system is adapted to compute the rectangular coordinates of said movable element from said first and second counts.

14. The device as defined by claim 5 further comprising means responsive to said first and second counts for computing the rectangular coordinates of said movable element.

15. The device as defined by claim 5 wherein said microprocessor system is adapted to compute the rectangular coordinates of said movable element from said first and second counts.

16. A graphical data digitizing device for determining the position of a movable element with respect to first and second reference locations, comprising:
a microprocessor system including a central processor unit, a memory, and a timing circuit for producing timing pulses which determine the rate at which said microprocessor performs individual instruction operations;
means controlled by said microprocessor system for generating acoustic wave energy pulses at said movable element;
first and second spaced acoustic receivers coupled to said microprocessor system;
said microprocessor system being adapted to initiate a first count of instruction cycles of said microprocessor system upon generation of a pulse of acoustic wave energy and to terminate said first count when said acoustic wave energy is received in said first receiver, said microprocessor system also being adapted to initiate a second count of instruction cycles of said microprocessor system upon generation of a pulse of acoustic wave energy and to terminate said second count when said acoustic wave energy is received at said second receiver;
said microprocessor system being adapted to store the terminated first count and the terminated second count;
said stored counts being indicative of the distance between said movable element and said first and second receivers, respectively.

17. The device as defined by claim 16 wherein said acoustic receivers comprise a pair of microphones having generally circular receptivity patterns.

18. The device as defined by claim 17 wherein said microphones are oriented with their axes in parallel relationship.

19. The device as defined in claim 18 wherein said microphones are mounted in spaced relation in a face of a elongated generally rectangular housing, and wherein said microprocessor system is contained within said housing.

20. The device as defined by claim 19 further comprising means responsive to said first and second counts for computing the rectangular coordinates of said movable element.

21. The device as defined by claim 18 further comprising means responsive to said first and second counts for computing the rectangular coordinates of said movable element.

22. The device as defined by claim 19 wherein said microprocessor system is adapted to compute the rectangular coordinates of said movable element from said first and second counts.

23. The device as defined by claim 18 wherein said microprocessor system is adapted to compute the rectangular coordinates of said movable element from said first and second counts.

24. The device as defined by claim 16 further comprising means responsive to said first and second counts for computing the rectangular coordinates of said movable element.

25. The device as defined by claim 16 wherein said microprocessor system is adapted to compute the rectangular coordinates of said movable element from said first and second counts.

26. A method for determining the distance between an object and a reference position, comprising the steps of:
provided a microprocessor system including a central processor unit, a memory, and a timing circuit for producing timing pulses which determine the rate at which said microprocessor system performs individual instruction operations;
generating propagating wave energy under control of said microprocessor system;
detecting the wave energy after it has passed between said object and said reference position; and
generating and storing in said microprocessor system a count that depends upon the number of instruction cycles performed by said microprocessor system during a time interval that is a function of the travel time of said wave energy traveling between said object and said reference position;
said count being indicative of the distance between said object and said reference position.

27. The method as defined by claim 26 wherein said step of generating wave energy comprises generating acoustic wave energy.

28. A graphical data digitizing method for determining the position of a movable element with respect to first and second reference locations, comprising the steps of:
providing a microprocessor system including a central processor unit, a memory, and a timing circuit for producing timing pulses which determine the rate at which said microprocessor performs individual instruction operations;
generating propagating wave energy under control of said microprocessor system; and
generating and storing in said microprocessor system a first count that depends upon the number of instruction cycles performed by said microprocessor system during a time interval that is a function of the travel time of said wave energy traveling between said movable element and said first location, and a second count that depends upon the number of instruction cycles performed by said microprocessor system during a time interval that is a function of the travel time of said wave energy traveling between said movable element and said second location;
said first and second counts being indicative of the distance between said movable element and said first and second locations, respectively.

29. The method as defined by claim 28 wherein said step of generating wave energy comprises generating acoustic wave energy.

30. The method as defined by claim 29 further comprising the step of computing the rectangular coordinates of said movable element as a function of the stored first and second counts.

31. The method as defined by claim 29 further comprising the step of adapting said microprocessor system to compute the rectangular coordinates of said movable element from the stored first and second counts.

32. The method as defined by claim 28 further comprising the step of computing the rectangular coordinates of said movable element as a function of the stored first and second counts.

33. The method as defined by claim 28 further comprising the step of adapting said microprocessor system to compute the rectangular coordinates of said movable element from the stored first and second counts.

* * * * *